Patented Oct. 17, 1933

1,930,716

UNITED STATES PATENT OFFICE 1,930,716

CATALYTIC OXIDATIONS OF ORGANIC COMPOUNDS

Alphons O. Jaeger, Mount Lebanon, Pa., assignor to Selden Company, Pittsburgh, Pa., a corporation of Delaware No Drawing. Application April 11, 1932
Serial No. 604,659

13 Claims. (Cl. 260—57)

This invention relates to the catalytic oxidation of organic compounds in the vapor phase, and more specifically to such oxidations in the presence of a new class of catalysts.

Acording to the invention, catalytic oxidations such as the oxidation of naphthalene to phthalic anhydride, anthracene to anthraquinone, phenanthrene to phthalic anhydride and maleic acid, acenaphthene to naphthalic anhydride, fluorene to fluorenone, benzene, phenol, toluene, furfural and other unsaturated aromatic and heterocyclic compounds to maleic acid as well as aliphatic compounds such as methyl alcohol to formaldehyde and the like and catalytic purification reactions involving the selective combustion of undesired impurities such as the purification of crude anthracene, crude coal tar hydrocarbons, etc. are carried out in the presence of contact masses containing highly refractory carbides of elements of the 4th group of the periodic system such as silicon carbide, titanium carbide, zirconium carbide or mixtures or combination of such carbides, with or without the admixture of other substances. These carbides form excellent activators and carriers for the catalytically active materials commonly used in organic oxidation reactions, and possess the further important advantage that they have a high heat conductivity, thus permitting a much faster dissipation of the large amounts of heat generated in such reactions. Corresponding impure carbides such as "silit" or "siloxicon", which are silicon carbides containing free $SiO_2$, may also be used.

Silicon carbide is a hard, crystalline material varying in color from clear white through gray-green to black; it has a hardness of between 9 and 10 on the Mohr scale of hardness and is resistant to high temperatures and to the action of acids, acid gases, oxygen and the like. The product is usually obtained by the fusion of silica with carbon in an electric furnace, but the invention is not limited to silicon carbide resulting from any particular method of manufacture. The carbides of titanium and zirconium are also highly refractory and possess properties similar to those of silicon.

Catalytically active materials may be associated with these carbides by spraying, dipping, or other suitable means, or the finely divided carrier material may be homogeneously impregnated into or with the preferred catalyst. When coated catalysts are desired, it is sometimes advantageous to roughen or etch the surfaces of the silicon or other carbide granules, which can be effected by suitable treatment with caustic alkalies, alkali metallates, or mixtures of these, or by treatment with suitable acids such as hydrofluoric acid. This treatment not only produces a roughened surface on the carrier material which is better adapted for the application of catalytically active material, but the action of alkalies and alkali metallates produces an activated outer surface on the carbide particles which greatly enhances the activity of the finished catalyst.

In its broader aspects the invention is not limited to the association of any one catalyst with the carbide carrier materials, but on the contrary any suitable oxidation catalyst may be so used. Compounds of metals of the 4th, 5th, 6th, 7th and 8th groups of the periodic system, such as oxides of titanium, vanadium, chromium, molybdenum, tungsten, uranium, manganese, iron, cobalt or nickel, either singly or in combination, in the form of suitable salts containing these elements, may be used, as well as aluminum, zinc, cadmium and copper. Stabilizers which are compounds of the alkali forming metals, may also be associated with any of the above mentioned catalytically active materials, and serve to stabilize or smooth out the reaction and inhibit the formation of undesired reaction products.

The above mentioned catalytically active materials are not all specific catalysts for all organic oxidations, but we have found that the association with such specific catalysts of other substances having catalytic activity increases the activity of the catalyst when applied to a carrier containing carborundum or other silicon carbide, and is particularly favorable when stabilizers are used. The presence of these non-specific catalysts appears to extend the activity of the stabilizer and also to favor the production of intermediate products which undergo further change to produce the desired end product; thus, for example, the activity of the oxidation catalyst is enhanced by the association of substances of the group consisting of dehydration catalysts, dehydrogenation catalysts, reduction catalysts, splitting catalysts, and the like.

In addition to the coating or impregnation of silicon or other carbide carriers with catalytically active materials, this substance may also be advantageously associated with catalysts by incorporation into catalytically active zeolites or non-siliceous base exchange bodies as a diluent either alone or in admixture with other diluents such as quartz powder, alundum, diatomaceous earth, etc., the silicon carbide being introduced by admixture with one or more of the components of the base exchange body before formation, by incorporation into the gel that first forms when these components are mixed under conditions neutral or alkaline to litmus, or by any other suitable method of introduction. Catalysts of this type, of course, preferably contain the silicon carbide in finely divided form, as this produces a homogeneous contact mass having a longer life, but in some cases it is advantageous to coat the zeolite onto larger fragments of silicon carbide and catalysts prepared in this manner are also included in the invention.

Finely divided silicon, titanium or zirconium carbides alone or in admixture with quartz powder, alundum, kieselguhr, etc., can also be associated directly with oxidation catalysts, such as oxides of vanadium, by intimately incorporating them with the metal oxides or other catalytically active substance in molten form; thus, for example, the carbides either singly or in admixture may be stirred into molten vanadium oxide after which the mass is formed into pellets or allowed to harden and broken into pieces.

The invention will be further described in conjunction with the following examples, which are for illustrative purposes only and to which it is not limited.

*Example 1*

1 liter (3.24 pounds) of No. 10 "Carborundum", as sold in the trade by the Carborundum Company, and which may be purified by washing with sulfuric acid, are sprayed with a copper vanadate solution which is prepared as follows:

108 grams ammonium metavanadate are dissolved in about 1600 cc. boiling distilled water with the addition of 5–10 cc. ammonia water to clear up any cloudiness that may develop. To the hot solution is added a solution of 14 grams copper nitrate in about 100 cc. of boiling distilled water and additional amounts of ammonia water are added until the yellowish precipitate which first forms is redissolved. The solution is kept hot and is sprayed upon the heated carborundum fragments which are agitated in a porcelain dish upon a sand bath, in order to evaporate the solvent as fast as the solution is applied.

The catalyst, after calcination at 200–400° C. in air or dilute $SO_2$ gases is filled into a tubular converter and vapors of naphthalene in admixture with air in the proportion of 1: 20 parts by weight are passed over it at 360–420° C., producing 80% yields of phthalic anhydride of excellent purity. Instead of carborundum, titanium or zirconium carbides, may be used, and the catalyst can also be used for the oxidation of acenaphthene to naphthalic anhydride, fluorene to fluorenone, and benzene, toluene, phenols and furfural to maleic acid.

*Example 2*

350 parts by volume of titanium carbide in the form of pea-sized fragments are coated with a solution containing 28 parts by weight of $V_2O_5$ and 4.2 parts $Ag_2O$ in the form of their salts, a suitable solution being obtained by adding a silver nitrate solution to a solution containing ammonium metavanadate and adding ammonia to dissolve the precipitate that first forms. The granules are coated as described in Example 1 and after heating for 3-4 hours at 380–450° C. in air or dilute $SO_2$ or $SO_3$ gases are used for the vapor phase catalytic oxidation of organic compounds. The catalyst is well suited for the oxidation of acenaphthene to acenaphythylene, naphthalic anhydride and hemimellitic acid, as well as for the oxidation of naphthalene to phthalic anhydride, phenanthrene to phthalic anhydride and maleic acid, crude tar acids to maleic and fumaric acid and other compounds containing the group $$-CH_2-CH=CH-CH_2-$$

In this catalyst the titanium, which is both a dehydration and dehydrogenation catalyst, acts as a stabilizer promoter or non-specific catalyst to enhance the activity of the silver vanadate.

*Example 3*

A stabilized catalyst is prepared by coating 400 parts by volume of pea-sized silicon carbide particles with a suspension containing 20.3 parts by weight $V_2O_5$, 26 parts KOH, 5.6 parts $MnSO_4$, 8 parts $Fe_2O_3$ and 25 parts $K_2SO_4$ in 500 parts of water. The coating is effected by spraying the suspension upon the heated carrier fragments, which are agitated to insure a uniform coating, and the catalyst is calcined with air or $SO_2$ gases for four hours. The resulting contact mass is well suited for the oxidation of both aromatic, aliphatic and heterocyclic compounds to intermediate oxidation products such as the oxidation of cresol to salicylaldehyde and salicylic acid, mono and polyhydric alcohols to aldehydes, ketones and acids such as methyl alcohol to formaldehyde and the like as well as for the oxidation of benzol, phenol and their homologues and furfural to maleic acid. The catalyst is also excellently suited for the oxidation of anthracene to anthraquinone and for catalytic purification reactions in which an undesired impurity is burned out, such as the oxidation of organic impurities and sulfur containing compounds such a hydrogen sulfide from coal tar ammonia.

When purified or semipurified anthracene admixed with air in the ratio 1:20–30 parts by weight are passed over this catalyst placed in a tubular converter at temperatures of 360–420° C. an excellent yield of anthraquinone of high purity is obtained,

*Example 4*

400 parts by volume of powdered silicon carbide of 30–100 mesh is mixed successively with 180 parts by weight 33° Be. potassium silicate solution, 80 parts of a 15% potassium aluminate solution and 200 parts of a potassium aluminum polyvanadate solution containing 15% $V_2O_5$. The mass is formed into pellets and calcined at 480° C. for three hours with diluted $SO_2$ gases after which vapors of acenaphthene mixed with air in the ratio of 1:15–25 parts by weight are passed over it at 360–430° C. 75–90% yields of naphthalic anhydride of excellent purity are obtained.

*Example 5*

600 parts by volume of silicon carbide fragments of pea-size are sprayed with a solution containing 55 parts by weight $V_2O_5$ and 3 parts $Al_2O_3$. After heating in air for 3 hours at temperatures of 430–460° C. the catalyst is excellently suited for the oxidation of organic impurities in by product ammonia.

If desired, the silicon carbide fragments may be first etched by boiling for ½–3 hours in a concentrated potassium aluminate solution, or potassium hydroxide may be used. When so treated, a uniform coating is readily obtained, and the catalyst is also excellently suited for the catalytic oxidation of naphthalene to phthalic anhydride. The catalyst may be further stabilized by the addition of small amounts of potassium sulfate or potassium chloride to the coating solution, in which case the resulting contact mass may also be used for the oxidation of acenaphthene to naphthalic anhydride.

*Example 6*

575 parts by volume of pea-sized carborundum particles are sprayed with 200 parts by volume of a 10% zinc permanganate solution and are then treated with a solution containing 22 parts by weight of potassium metavanadate. The catalyst after calcining in air for 3-4 hours at 420-450° C. is excellently suited for the oxidation of toluene to benzaldehyde and benzoic acid.

*Example 7*

8.7 parts of $Fe_2O_3$ freshly precipitated from the corresponding salts by means of alkali, are mixed with 8 parts of $TiO_2$ in the form of a finely ground powder, the $TiO_2$ being also freshly precipitated from titanium salt solutions. The mixture of the oxides is suspended in 100 parts of water and 14.2 volumes of 10 N KOH solution are then added. The suspension is coated onto 200-250 volumes of pea-sized carborundum fragments in the usual manner and then calcining at 400-500° C. The stabilized catalyst obtained is well adapted for the catalytic purification of crude anthracenes of various grades of purity and a substantially complete total combustion of the carbazole is obtained under proper reaction conditions.

Crude anthracene obtained by various methods and containing different percentages of anthracene, such as for example anthracene press cake from a filter press or a hydraulic press or crude anthracene resulting from the washing of anthracene press cake at room temperatures or higher or crude anthracene obtained by centrifuging and washed or recrystallized from solvents, such as for example benzol, toluol, solvent naphtha, creosote oil, carbon sulfide, acetone, carbon tetrachloride, gasoline, pyridine, and quinoline bases, may be used in the process. Crude anthracene containing about 30% of anthracene, 22% of carbazole and 46-48% of phenanthrene is uniformly vaporized into an air stream in the ratio of 1:15 to 1:30 and passed over the contact mass at 380-440° C. When the reaction temperature is 380° C. a product is obtained which contains about 3.5% carbazole. At 400° C. the product contains only 1.38% carbazole and at temperatures of 420-440° C. no trace of carbazole can be detected by the Kjeldahl method. The reaction product, therefore, consists substantially of anthracene and phenanthrene, which latter can be easily separated by recrystallization with a minimum amount of coal tar solvent, such as solvent naphtha or toluol, resulting in an anthracene which is from 95.8 to 96.9% pure. From the mother liquor of the recrystallization process a very pure phenanthrene can be recovered and is particularly useful for catalytic oxidation to phthalic anhydride and maleic acid. The amount of phenanthrene which is recovered will depend on the reaction conditions which can be so varied that phenanthrene is either recovered to a very large extent or is partially burned out. Thus, reaction products containing different ratios of anthracene and phenanthrene can be obtained. When the reaction is carried out at 380° C. the reaction product obtained contains 62-68% of anthracene, the remainder being mostly phenanthrene. At temperatures between 400-440° C. the reaction product contains between 70 and 75% anthracene, showing that considerable amounts of phenanthrene have been burned. It will be apparent from the above that the temperature is an important reaction condition and determines the extent to which the carbazole and part of the phenanthrene is removed from the crude anthracene by combustion. It also shows that a reliable control of the heat evolved in the reaction is importat, particularly where large amounts of phenanthrene are to be recovered.

The contact mass used may be varied. Thus, for example $Fe_2O_3$ may be partly replaced by CuO, NiO and particularly CoO. The titanic oxide can be partly or wholly replaced by $Al_2O_3$, $ZrO_2$, $CeO_2$, $ThO_2$, or CdO singly or in admixture and stabilizers other than KOH may be used such as $K_2CO_3$, $KNO_3$, KCN, NaOH or $Na_2CO_3$, singly or in admixture.

What is claimed as new is:

1. A process of oxidizing organic compounds, which comprises passing vapors of the compounds at reaction temperatures, in admixture with gases containing free oxygen, over a contact mass containing an oxidation catalyst and also containing at least one substance selected from the group consisting of silicon carbide, titanium carbide and zirconium carbide.

2. A process of oxidizing aromatic compounds, which comprises passing vapors of the compounds at reaction temperatures in admixture with gases containing free oxygen over a contact mass containing an oxidation catalyst and also containing at least one substance selected from the group consisting of silicon carbide, titanium carbide and zirconium carbide.

3. A process of oxidizing aliphatic compounds, which comprises passing vapors of the compounds at reaction temperatures in admixture with gases containing free oxygen over a contact mass containing an oxidation catalyst and also containing at least one substance selected from the group consisting of silicon carbide, titanium carbide and zirconium carbide.

4. A process of oxdizing organic compounds, which comprises passing vapors of the compounds in admixture with gases containing free oxygen at reaction temperatures over a contact mass comprising a substance selected from the group consisting of silicon carbide, titanium carbide and zirconium carbide, with which is associated a compound of a metal of the 5th and 6th groups of the periodic system.

5. A process of oxidizing organic compounds, which comprises passing vapors of the compounds in admixture with gases containing free oxygen at reaction temperatures over a contact mass comprising a substance selected from the group consisting of silicon carbide, titanium carbide and zirconium carbide, with which is associated a compound of vanadium.

6. A process according to claim 4, in which the contact mass also contains a compound of an alkali forming metal.

7. A process according to claim 4, in which the contact mass also contains a catalyst selected from the group consisting of dehydration catalysts, dehydrogenation catalysts, reduction catalysts, and splitting catalysts.

8. A process of oxidizing naphthalene to phthalic anhydride, which comprises vaporizing the naphthalene and passing it in admixture with air at reaction temperatures over a contact mass containing an oxidation catalyst and also containing at least one compound selected from the group consisting of silicon carbide, titanium carbide and zirconium carbide.

9. A process of oxidizing naphthalene to phthalic anhydride, which comprises vaporizing the naphthalene and passing it in admixture with air at reaction temperatures over a contact mass containing at least one compound selected from the group consisting of silicon carbide, titanium carbide and zirconium carbide and also containing a compound of vanadium.

10. A process of oxidizing anthracene to anthraquinone, which comprises vaporizing the anthracene and passing it in admixture with air at reaction temperatures over a contact mass containing at least one compound selected from the group consisting of silicon carbide, titanium carbide and zirconium carbide and also containing a compound of vanadium.

11. A process according to claim 9, in which the catalyst also contains a compound of an alkali forming metal.

12. A process according to claim 10, in which the catalyst also contains a compound of an alkali forming metal.

13. A process of oxidizing organic compounds, which comprises passing the compounds in admixture with air, at reaction temperatures, over a contact mass comprising at least one compound selected from the group consisting of silicon carbide, titanium carbide, zirconium carbide in the form of fragments, the surfaces of which have been etched with alkalies and coated with specific oxidation catalysts.

ALPHONS O. JAEGER.